United States Patent
Gonsior

[11] Patent Number: 6,161,569
[45] Date of Patent: Dec. 19, 2000

[54] VALVE

[75] Inventor: Wolfgang Gonsior, Bodolz, Germany

[73] Assignee: XOMOX International GmbH & Co., Lindau/Bodensee, Germany

[21] Appl. No.: 09/280,521

[22] Filed: Apr. 5, 1999

[30] Foreign Application Priority Data

Apr. 4, 1998 [DE] Germany .................. 298 06 226 U

[51] Int. Cl.[7] .................................................. F10K 5/08
[52] U.S. Cl. .................. 137/375; 251/315.14; 251/172; 251/175; 251/317
[58] Field of Search .................. 251/315.14, 316, 251/317, 172, 175; 137/375

[56] References Cited

U.S. PATENT DOCUMENTS

| | | |
|---|---|---|
| 3,827,671 | 8/1974 | Bolden et al. ............................ 251/84 |
| 3,940,107 | 2/1976 | Allenbaugh . |
| 4,147,327 | 4/1979 | Moran ................................. 251/315.14 |
| 4,236,691 | 12/1980 | Wright ................................. 251/315.01 |

FOREIGN PATENT DOCUMENTS

| | | |
|---|---|---|
| 3205025 A1 | 7/1983 | Germany . |
| 3706215 A1 | 9/1988 | Germany . |
| 4235913 A1 | 5/1993 | Germany . |
| 9413091 U 1 | 12/1995 | Germany . |

*Primary Examiner*—A. Michael Chambers
*Attorney, Agent, or Firm*—Evenson, McKeown, Edwards & Lenahan, P.L.L.C.

[57] ABSTRACT

A valve including a housing, a rotatable body which can turn inside the housing, and two sealing rings made of sealing material, preferably polytetrafluoroethylene or a similar plastic. The sealing rings are arranged in an axially spaced manner in the housing and rest against the spherical outer surface of the rotatable body and provide a sealing function. The valve is designed with at least one sealing ring having a sealing lip which lies essentially tangential to an outer surface of the rotatable body at a contact surface, and a junction region of the sealing lip is located on a radial interior of the valve housing and is attached to a base body of the sealing ring. The valve is designed such that increased pressure causes the tangential contact surface of the sealing lip to be urged radially inwardly against the rotatable body so that the rotatable body is supported by the junction region in cases of high stress. In this way the rotatable body can be operated with reduced and reproducible torques.

22 Claims, 3 Drawing Sheets

VALVE

BACKGROUND OF THE INVENTION

The invention relates to a valve comprising a housing, a rotatable body which can turn inside the housing, and a pair of sealing rings which are arranged axially spaced in the housing and rest sealingly against the outer surface of the rotatable body.

A valve of this type, which is designed as a ball valve, is known from published German patent application No. DE 3,205,025. In the housing a ball-shaped rotatable body is situated so as to be rotatable and floating and serves to block or restrict a flowing medium, and a shaft, sealed by the housing and passing through it, is provided for turning. The sealing or seating rings for the rotatable part are comprised of an appropriate sealing material such as polyamide, graphitic carbon, or PTFE (polytetrafluoroethylene), are solid, and have a closed cross-sectional area. At least one of the sealing rings, which will also be referred to hereinafter as seating rings, is associated with a spring arrangement designed to provide a prestress of the seating ring oriented against the spherical outer surface of the rotatable body. Such spring arrangements require an additional manufacturing and assembly cost. Furthermore, difficulties result when corrosive materials are conducted through the pipes in which such a valve is being used. It is known that valves today are increasingly being coated inside, particularly with synthetic resin material, above all in order to satisfy the safety requirements regarding corrosive materials or to avoid the use of expensive corrosion-resistant metals. Plastics like PTFE, PFA (perfluoroalkoxy) and FEP (Fluorinated ethylene propylene) absolutely resist corrosion by practically all acids and alkaline solutions of any concentration and can thus be used anywhere. In such a situation spring parts made from metal would pose an additional risk factor or require additional and expensive measures, if indeed it is possible technologically and economically to realize a non-corrosive embodiment.

A sealing ring made of PTFE for sealing the ball of ball valves is known from published German patent application No. DE 3,706,215. The sealing ring has a angle profile section which is open on the back side and has an outer casing which is essentially coaxial with the longitudinal axis as well as an annular disk-shaped sealing collar against which the ball surface lies. The sealing collar is supported on its back side opposite the ball surface by a support ring with an essentially triangular cross-section, against which the sealing collar can be flexibly bent back. It is not possible to change the bearing surface of the sealing ring on the ball surface as a function of the axial load, and a permanent plastic deformation of the sealing collar can already occur after a short while in use.

Furthermore, a sealing element is known from the German Utility Model No. DE-U 94/13,091, particularly for use in adjusting members for liquid or gaseous media.

Disk springs are integrated into the sealing element, which involves a substantial manufacturing cost.

Furthermore, a valve, particularly a ball valve, is known from U.S. Pat. No. 3,940,107, whose sealing ring exhibits a frame which is oriented essentially radially. On the radially inner end of the frame, a sealing lip is provided which lies against the rotatable ball and which has an extension on the side opposite the ball for providing support in the housing. The frame has a recess in both the direction facing the ball and the direction axially opposite the housing, so that sufficient flexibility is provided for the frame and the sealing lip. A defined axial support of the sealing lip via its extension in the housing is not in itself possible as both the sealing lip and the extension yield outwards or inwards in the radial direction under axial strain.

Finally, a ball valve is known from published German patent application No. DE 4,235,913, whose housing is provided with a lining of synthetic resin. The ball lies directly on the lining, where a resilient insert is provided either in the lining itself or in an annular groove of the housing. The manufacturing cost for such an elastic insert is not insignificant, and relatively narrow manufacturing tolerances must be maintained in order to obtain a sufficient seal. The seal function is negatively affected over time due to wear and plastic deformation.

Seating rings made from PTFE or a similar sealing material exhibit plastic deformation such that due to forces encountered during assembly and additionally due to the differential pressure which has to be supported during normal operation, plastic deformation already occurs, and this plastic deformation does not regain its shape, or only does so slowly, thereby raising a danger of reduced sealing power and consequent leakage. A construction whose assembly requires a relatively high sealing force, which in principle is only needed at higher pressures, requires quite a high torque in order to operate even in a state with no pressure. In order to obtain sufficiently reproducible conditions, the permissible manufacturing tolerances must be kept within a small range, especially since the sealing power is additionally influenced by operating conditions such as pressure, temperature, etc. Particularly in valves lined with plastic, rotatable bodies are provided, especially metal balls or conical plugs which are similarly coated with synthetic resin, or balls which consist of other materials, such as oxide ceramics, which are appropriate for contact with corrosive media.

SUMMARY OF THE INVENTION

It is therefore an object of the invention to improve a valve of the aforementioned type so that reduced and reproducible torques are required for operation of the rotatable body without any need to provide special spring elements.

Another object of the invention is to provide a valve which can be manufactured at reduced cost.

A further object of the invention is to provide a valve design in which the effects of manufacturing tolerances and temperature variations on the sealing tightness and on the operating torque are reduced.

It is also an object of the invention to provide a valve design which can be used as a synthetic resin lined valve.

These and other objects are achieved in accordance with the present invention by providing a valve comprising a housing, a rotatable body which can turn inside said housing, and two axially spaced sealing rings arranged in the housing and resting sealingly against an outer surface of the rotatable body, wherein at least one sealing ring has a sealing lip which lies substantially tangential to the outer surface of the rotatable body; a radially inwardly disposed junction region of the sealing lip is provided with a base body, and increased pressure causes a contact surface between the sealing lip and the rotatable body to be urged radially inwardly so that the rotatable body is supported by the junction region upon application of increased pressure.

The proposed valve can be constructed at low cost and allows for a larger range of manufacturing tolerances. The sealing or seating ring contains a base body without an additional spring means located in the housing and comprises a flexible sealing lip having an inner surface which rests essentially tangentially on the spherical outer surface of the floating rotatable body, where in a radially inwards direction with respect to the longitudinal axis there is a junction and support region between the base body and the sealing lip. In an unstressed state, the flexible sealing lip is principally deformed in the elastic region. The seating or inner surface of the seating ring has two partial surfaces running approximately tangentially to the outer surface of the rotatable body at different angles, and after assembly or in an unstressed state an approximately linear or only very small contact surface exists on the rotatable body. The torque is minimized while efficient sealing is assured. When the differential pressure increases, i.e., in the low and middle pressure range, the flexible sealing lip is likewise deformed in the elastic region, whereby the contact surface remains small and largely constant, and the low reaction force only requires a low torque. When differential pressure increases further, the contact surface is displaced radially inwardly toward the junction and support region, which henceforth assures a functionally secure supporting of the rotatable body. This increases the sealing action of the seating ring on the outlet side because the pressure of the media acts on the back side of the sealing lip and presses it harder against the rotatable body. It is particularly important that the sealing lip essentially deforms only elastically and undergoes no plastic changes, even in the upper pressure range up to the maximal differential pressure. In the upper pressure range or at a high differential pressure, the rotatable body is supported by the previously mentioned junction region of the seating ring. Plastic deformation which occurs in this situation has no negative effects. When the differential pressure is reduced, the elastically deformable sealing lip rests with the requisite sealing action, and even a gap caused by plastic and/or elastic deformation of the junction region, which only very slowly regains original shape after a long period of time, doesn't result in leakage. The combination of the elastically deformable sealing lip and the plastically deformable junction region allow for a wider range of manufacturing tolerances. In accordance with the invention, manufacturing tolerances and changes in temperature have a significantly reduced influence on the sealing force and tightness as well as on the torque for operating the rotatable body.

The inner surface of the sealing lip is designed particularly advantageously so that two partial surfaces are arranged at an obtuse angle with regard to one another. Preferably, in an unstressed state the sealing lip rests on the rotatable body in the region of the line of intersection of both of the, preferably conical, partial surfaces, where there is an at least approximately linear contact in this region. Thus, a lower torque is required to operate the rotatable body in an unstressed state or at a low differential pressure. Additionally, a plastic deformation of the flexible sealing lip is avoided during turning in of the valve gate edge in the region of the seating ring of the rotatable body. The aforementioned second partial surface is inclined relative to the longitudinal axis of the seating ring at an angle larger than the tangential angle, in particular larger than 45 degrees, whereby an undesirably strong pressing is avoided during the turning in and the coaxial alignment of the rotatable body or its longitudinal axis to the longitudinal axis of the seating ring.

Refinements and specific embodiments of the invention are described in the rest of the specification.

BRIEF DESCRIPTION OF THE DRAWINGS

The invention will be described in further detail hereinafter with reference to a specific illustrative embodiment depicted in the accompanying drawings in which.

DETAILED DESCRIPTION OF PREFERRED EMBODIMENTS

Figure 1:
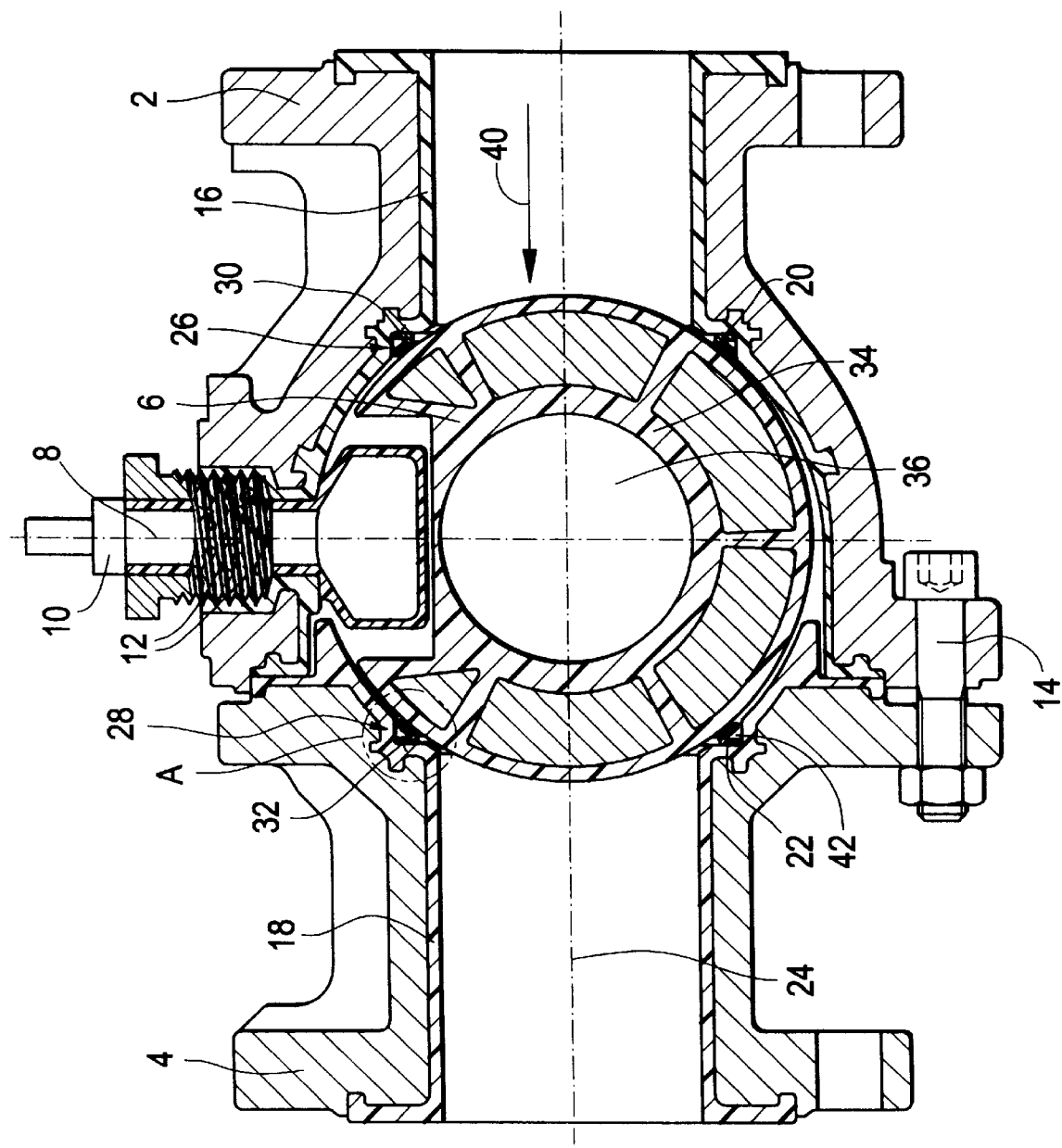
FIG. 1 is a lengthwise cross-section of a valve according to the invention designed as a ball valve.

FIG. 1 shows a valve with a two-part housing 2, 4 in which a rotatable body 6 can rotate around an axis 8 and preferably is arranged so as to float. A shaft 10 is connected to the rotatable body 6, which preferably is designed as a ball, and extends through the housing 4, where sealing means 12 are provided. The two housing parts 2, 4 which make up the housing, are connected to each other via screws 14 in a known manner, and the inner surfaces which come in contact with the medium are provided with linings 16, 18, which advantageously may be made of synthetic resin (plastic).

In addition, two seating rings 20, 22 are arranged axially spaced with regard to the longitudinal axis 24 of the housing and in contact with the rotatable body 6. The seating rings 20, 22 have a v-shaped cross-section and are composed of a plastically and elastically deformable sealing material, in particular PTFE or a comparable material or synthetic resin. The housing parts 2, 4 contain essentially right-angled receptacles 26, 28 for the respective seating rings 20, 22, which lie against on a supporting surface 30, 32 facing away from the rotatable body 6. The rotatable body 6, which is designed as a ball, is composed substantially of metal, whereby the surfaces which come into contact with the medium are provided with a lining 34, particularly of synthetic resin (i.e., plastic). In its interior, the rotatable body 6 is provided with a through bore 36 in a known manner. In the position in which the rotatable body is shown, the flow path is blocked, whereas after a 90-degree turn with respect to the axis of rotation 8, the medium can flow through the drilled hole 36 and through the valve.

If the valve is, for example, open to flow in the direction of arrow 40 when the rotatable body 6 is in the open position, then a force likewise in the direction of arrow 40 acts on the rotatable body 6 in the blocked position shown in FIG. 1. The rotatable body 6, which in particular is mounted so as to float, is displaced in the same direction against the seating ring 22 which is installed on the side opposite the pressure, whereby the seating ring on the inlet side is relieved from stress. When a given differential pressure is reached, the sealing power of the seating ring 20 on the inlet side is reduced such that leakage occurs there. Because of the v-shaped construction of at least the seating ring 22 which is on the side opposite the pressure and the annular space 42 formed in this way at the back side of the flexible sealing lip, a force component is in effect which supports the sealing power of this sealing lip. Thus, at higher differential pressures, the sealing lip of the seating ring 22 installed on the side opposite the pressure is pressed against the rotatable body with increased support by the medium.

Figure 2:
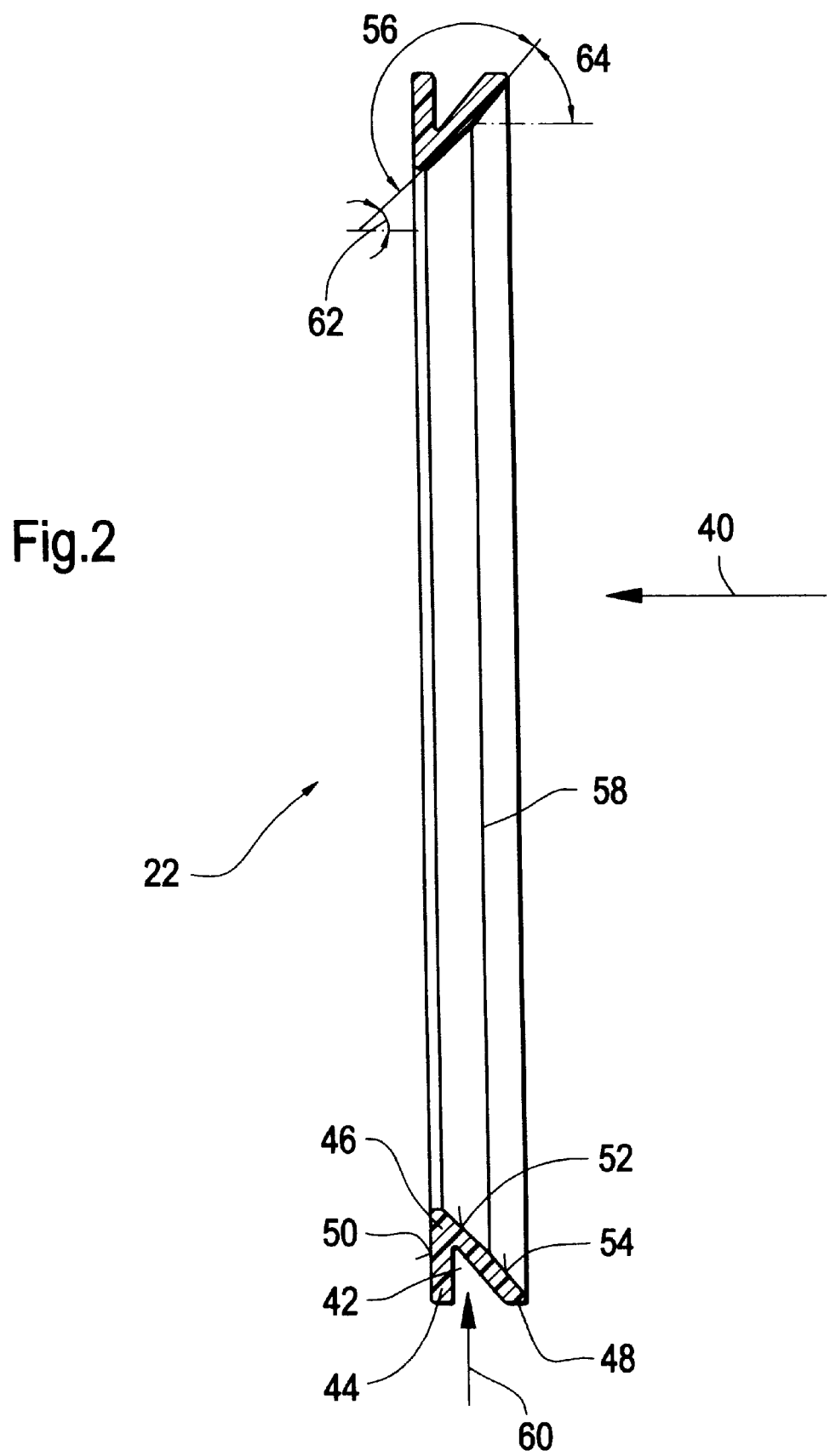
FIG. 2 is an axial section of the seating ring of the valve of FIG. 1.

FIG. 2 is an enlarged view of the seating ring 22 with its V-shaped cross-section. The seating ring 22 includes a base body 44, a radially inwardly disposed solid junction region 46, and a sealing lip 48 which is inclined radially outwardly relative to the longitudinal axis 24. The annular space 42 referred to above lies between the base body 44 and the sealing lip 48. The base body 44 has a contact surface 50, essentially on a radial plane, with which the seating ring 22 lies against the above-mentioned supporting surface 32 of the housing which is essentially orthogonal to the longitudinal axis. The inner surface of the sealing lip 48 facing the rotatable body comprises a first, radially inward partial surface 52 and a second partial surface 54 located further out radially. These two preferably conical partial surfaces 52, 54 are arranged at an obtuse angle 56 and intersect in an intersection line 58, which lies at least approximately in the middle of the radial extension of the inner surface. The obtuse angle of intersection 56 is advantageously in the range of 80 to 89°, in particular in the range from 83 to 86°. Furthermore it is important that the first partial surface 52 is at least approximately tangential to the contact region of the outer surface of the rotatable body 6. If in a particular embodiment the angle of inclination 62 of the first inner partial surface 52 is, for example, 45°, then the angle of inclination 64 of the outer second partial surface 54 is selected to be 50°, and consequently the aforementioned noted obtuse angle 56 is 85°. The outer angle of inclination 64 is preferably a prescribed small angle greater than the tangential inner angle of inclination 62.

Preferably, the seating ring 22 is arranged against the rotatable body such that in an unstressed state or at a low differential pressure, the contact surface of the sealing lip 48 against the outer surface of the rotatable body contains the line of intersection 58 and/or is essentially formed by this line of intersection. This assures on the one hand a functionally secure sealing, and on the other hand only a rather low torque is required to operate the valve. As has already been explained, with an increase in differential pressure, the rotatable body is moved in the direction of the arrow 40 and pressed with increased force against the seating ring 22. Thus, in accordance with the invention, the contact surface is increased and/or displaced radially inwardly to the junction region 46. The solid, largely stiff junction region 46 assures that the rotatable body will be securely supported under higher stresses up to the maximal differential pressure at which plastic deformation occurs. In this respect, it is most important that the flexible sealing lip 48 essentially only be deformed elastically. The plastic deformation of the junction region 46 does not have negative consequences when the differential pressure is subsequently reduced because functionally secure sealing is assured by the sealing lip 48. During or after the differential pressure is reduced, the rotatable body moves against the direction of the arrow 40 back into its initial position, and the deformation of junction region 46 can reverse itself.

If at high differential pressures there is leaking at the seating ring on the inlet side, as already mentioned above, the pressure of the medium comes into play in annular space 42 and presses the sealing lip 48 of the seating ring 22 on the outlet side more intensely against the rotatable body 6. At maximum differential pressure the sealing lip 48 is pressed against the spherical outer surface of the rotatable body in a particularly advantageous manner with substantially its entire inner surface, that is, with the first partial surface 52 as well as with the second partial surface 54. In addition, the seating ring 22 according to the invention is designed such that at high differential pressures, due to the pressure of the medium acting on the seating ring 22, the junction region 46 is elastically deformed in accordance with arrow 60 in a radially inward direction towards longitudinal axis 24. The entire seating ring 22 is thus pushed in a wedge shape into the gap between the housing and the rotatable body. The design of the seating ring is provided according to the invention such that in this respect only an elastic deformation occurs which immediately reverses itself after the pressure abates. In contrast, the axial deformation described above caused by the axial pushing of the rotatable body due to the high differential pressure also leads to a quasi plastic deformation of the junction region, which only reverses itself after a long time if at all, where, however, the sealing lip 48 is similarly only deformed elastically. After the pressure abates, the sealing effect is effectively preserved by means of the elastic sealing lip 48, and the gradual reversal of the plastic deformation of the junction region has no negative consequences on the overall sealing effect.

Figure 3:
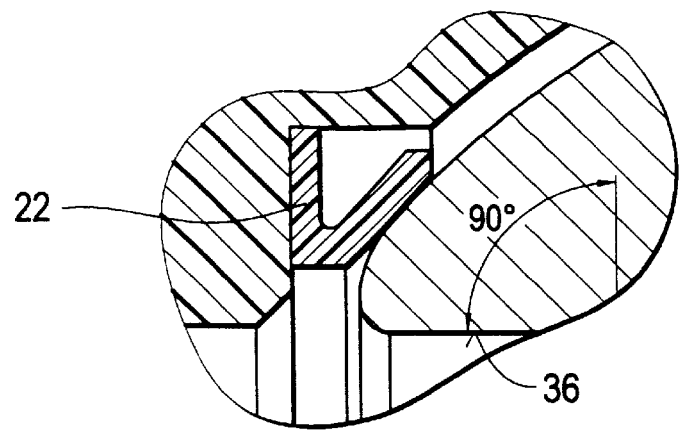
FIG. 3 is an enlarged schematic detail view A of FIG. 1 in an unstressed state.

FIG. 3 shows detail view A in accordance with FIG. 1, in which the rotatable body has been turned 90° with respect to the rotational axis, and the through hole 36 is arranged coaxially with respect to the longitudinal axis 24, to which the line 66 given as an aid runs parallel. The conical inner partial surface 52 extends at an angle of inclination 62 and the conical outer partial surface 54 at an angle of inclination 64 with respect to the auxiliary line 66 or the longitudinal axis. As can be seen, the line of intersection 58 in the contact region of the sealing lip 48 rests against the spherical outer surface of the rotatable body 6.

Figure 4:
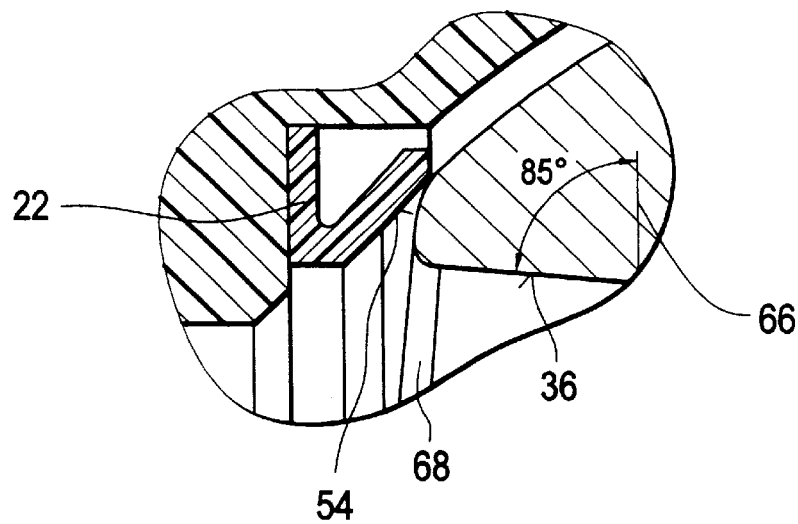
FIGS. 4 and 5 are enlarged detail views A during turning in of the rotatable body.
Figure 5:
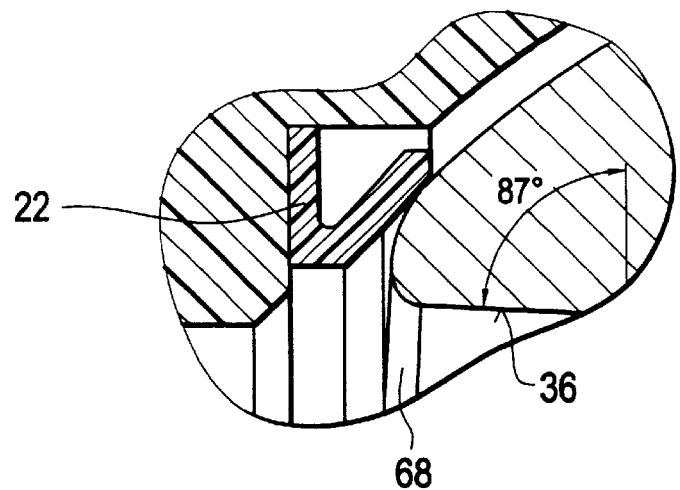

FIGS. 4 and 5 show the rotatable body 6 in partially opened states, where according to FIG. 4 the longitudinal axis of the rotatable body deviates by 50 from a coaxial alignment with the longitudinal axis of the seating ring 22, while in FIG. 5 the deviation amounts to only 30. The turning in of the advantageously rounded-off valve gate edge 68 of the through hole 36 can be accomplished without difficulty due to the larger outer angle of inclination. The turning in is made possible by the angular displacement of the outer partial surface 54 according to the invention, without the radial free end interfering with the turning process or being damaged by it.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A valve comprising a housing, a rotatable body which can turn inside said housing, and two axially spaced V-shaped sealing rings arranged in the housing and resting sealingly against an outer surface of the rotatable body, wherein at least one V-shaped sealing ring includes a junction region which faces a longitudinal axis of the valve and a sealing lip which extends from the junction region at least partially radially outwardly relative to the longitudinal axis of the valve and lies substantially tangential to the outer surface of the rotatable body at a contact surface, the junction region being connected to a base body, whereby an increased pressure causes the tangential contact surface between the sealing lip and the rotatable body to be displaced radially inwardly toward the longitudinal axis of the valve so that the rotatable body is substantially supported by the junction region upon application of an increased pressure.

2. A valve according to claim 1, wherein said sealing rings are made from a sealing material selected from the group consisting of polytetrafluoroethylene, polyamide, and graphitic carbon.

3. A valve according to claim 1, wherein said rotatable body is spherical.

4. A valve according to claim 1, wherein the sealing lip is flexible and an inner surface of the sealing lip which faces the rotatable body comprises two partial surfaces arranged at an obtuse angle.

5. A valve according to claim 4, wherein said partial surfaces each have an essentially conical configuration.

6. A valve according to claim 4, wherein the sealing lip in an unstressed state rests against the rotatable body along a line of intersection between said partial surfaces.

7. A valve according to claim 4, wherein said two partial surfaces comprise inner and outer partial surfaces which intersect along a line essentially halfway along a radial extension of an inner surface of the sealing lip.

8. A valve according to claim 1, wherein said sealing lip is flexible and is arranged inclined at an angle of about 45 degrees relative to the longitudinal axis of the valve.

9. A valve according to claim 1, wherein a radially inner first partial surface of said sealing lip is arranged at an angle of inclination of about 45° relative to the longitudinal axis of the valve.

10. A valve according to claim 9, wherein a radially outer second partial surface of said sealing lip is inclined relative to the longitudinal axis at an angle of inclination which is larger by an angle of 3 to 8° than the angle of inclination of said first partial surface.

11. A valve according to claim 10, wherein said angle of inclination of said second partial surface is larger by an angle of 4 to 7°.

12. A valve according to claim 1, wherein the base body and the junction region are located in a common radial plane.

13. A valve according to claim 1, wherein the junction region of the sealing lip lies against the support surface of the valve housing which lies essentially in a radial plane.

14. A valve according to claim 1, wherein the sealing ring is composed of a plastically and elastically deformable sealing material and is designed and arranged in the housing in combination with the rotatable body such that the sealing lip is essentially only elastically deformable under pressure, and the junction region is both plastically and elastically deformable.

15. A valve according to claim 1, wherein the housing is lined with a synthetic resin material resistant to damage from a fluid medium flowing through the valve.

16. A valve according to claim 1, wherein portions of said rotatable body which come into contact with a fluid medium flowing through said valve are provided with a covering of a material which is resistant to damage from the fluid medium.

17. A valve according to claim 1, wherein said rotatable body is made of a material with is resistant to damage from a fluid medium flowing through the valve.

18. A valve according to claim 1, wherein the sealing ring has an essentially triangular annular space on the opposite side of the sealing lip from the rotatable body.

19. A valve according to claim 1, wherein a surface of the sealing lip on the opposite side from the rotatable body is exposed to a fluid medium flowing through the valve such that an increase in pressure of the medium will urge the sealing lip with increased force against the rotatable body.

20. A valve according to claim 1, wherein the base body extends from the junction region radially outwardly relative to the longitudinal axis of the valve and lies against a support surface of the valve housing.

21. A valve comprising:

a housing;

a rotatable body which can turn inside the housing; and a sealing ring means arranged in the housing and including a junction region and a sealing lip, the sealing lip arranged to lie substantially tangential to an outer surface of the rotatable body at a contact surface, the sealing ring means supporting the rotatable body such that at an increased pressure, the tangential contact surface between the sealing lip and the rotatable body is displaced radially inwardly toward a longitudinal axis of the valve, so that the rotatable body is substantially supported by the junction region of the sealing ring means.

22. A valve according to claim 21, wherein the junction region of the sealing ring means faces the longitudinal axis of the valve and the sealing lip extends from the junction region at least partially radially outwardly relative to the longitudinal axis of the valve.

* * * * *